(12) United States Patent
Beise

(10) Patent No.: US 10,976,425 B2
(45) Date of Patent: Apr. 13, 2021

(54) RADAR SYSTEM OPERATING METHOD AND RADAR SYSTEM HAVING IMPROVED RANGE RESOLUTION BY MUTUALLY DELAYED ORTHOGONAL CODES

(71) Applicant: IEE INTERNATIONAL ELECTRONICS & ENGINEERING S.A., Echternach (LU)

(72) Inventor: Hans-Peter Beise, Perl (DE)

(73) Assignee: IEE INTERNATIONAL ELECTRONICS & ENGINEERING S.A., Echternach (LU)

(*) Notice: Subject to any disclaimer, the term of this patent is extended or adjusted under 35 U.S.C. 154(b) by 0 days.

(21) Appl. No.: 16/768,006

(22) PCT Filed: Nov. 27, 2018

(86) PCT No.: PCT/EP2018/082682
§ 371 (c)(1),
(2) Date: May 28, 2020

(87) PCT Pub. No.: WO2019/105922
PCT Pub. Date: Jun. 6, 2019

(65) Prior Publication Data
US 2020/0363519 A1  Nov. 19, 2020

(30) Foreign Application Priority Data
Dec. 1, 2017  (LU) .................................. LU100528

(51) Int. Cl.
*G01S 13/32*   (2006.01)
*G01S 7/35*    (2006.01)
(52) U.S. Cl.
CPC ............ *G01S 13/325* (2013.01); *G01S 7/354* (2013.01)

(58) Field of Classification Search
CPC .... G01S 13/325; G01S 13/878; G01S 13/931; G01S 2013/93271; G01S 13/003;
(Continued)

(56) References Cited

U.S. PATENT DOCUMENTS

2012/0146844 A1   6/2012  Stirling-Gallacher et al.
2012/0293359 A1*  11/2012 Fukuda .................. G01S 13/64
                                           342/107

(Continued)

FOREIGN PATENT DOCUMENTS

DE   102014212284 A1   12/2015
DE   102014014864 A1    4/2016

OTHER PUBLICATIONS

A. Bourdoux et al., "PMCW waveform and MIMO technique for a 79 GHz CMOS automotive radar", IEEE Radar Conference, dated May 2, 2016, pp. 1-5.

(Continued)

*Primary Examiner* — Timothy A Brainard
(74) *Attorney, Agent, or Firm* — Reising Ethington P.C.

(57) ABSTRACT

A method of operating a modulated continuous-wave radar system at least includes steps of transmitting, with a modulation frequency, a plurality of n modulated continuous radar waves that represent mutually orthogonal codes towards a scene with a potential object to be detected, wherein the transmitted modulated continuous radar waves of the plurality of modulated continuous radar waves are consecutively transmitted with a constant time lag given by one nth of a period of the modulation frequency; digitally converting a plurality of reflected and received radar signals with a sampling rate that is equal to the modulation frequency; decoding individual range information for each received (Continued)

radar signal; and determining a range between the radar system and the object on the basis of the decoded individual range information.

10 Claims, 4 Drawing Sheets

(58) Field of Classification Search
CPC .......... G01S 13/34; G01S 7/023; G01S 13/18; G01S 13/36; G01S 2013/466; G01S 2013/9316; G01S 2013/9322; G01S 7/006; G01S 7/40; G01S 7/4004
See application file for complete search history.

(56) References Cited

U.S. PATENT DOCUMENTS

| | | |
|---|---|---|
| 2017/0131392 A1 | 5/2017 | Schoor et al. |
| 2017/0293028 A1 | 10/2017 | Trummer |

OTHER PUBLICATIONS

International Search Report corresponding to International Application No. PCT/EP2018/082682, dated Jan. 7, 2019, 4 pages.
Written Opinion corresponding to International Application No. PCT/EP2018/082682, dated Jan. 7, 2019, 7 pages.

* cited by examiner ically RADAR SYSTEM OPERATING METHOD AND RADAR SYSTEM HAVING IMPROVED RANGE RESOLUTION BY MUTUALLY DELAYED ORTHOGONAL CODES

TECHNICAL FIELD

The invention relates to a method of operating a modulated continuous-wave radar system and an automotive continuous-wave radar system operated by such method.

BACKGROUND

In the field of automotive technology it is known to employ radar technology, in particular continuous wave (CW) radar systems, in interior as well as exterior automotive applications, for providing improved safety in many ways. Most commonly, automotive radar systems are operated at radar carrier frequencies in regimes about 24 GHz or about 77 GHz. Many automotive radar system applications, such as parking assistant systems or seat occupant detection systems exploiting a breathing motion of occupants, require a high resolution in range to provide precise information about objects potentially appearing in the near field of the radar system. In such applications, the range resolution of an automotive radar system may be limited by the sampling rate of employed analog-to-digital converters.

SUMMARY

It is desirable to provide an automotive radar system with improved range resolution without tightening performance requirements, in particular with regard to a maximum sampling rate, for employed analog-to-digital converters.

It is therefore an object of the invention to provide an automotive radar system that is capable of providing improved range resolution with employed analog-to-digital converters of conventional sampling rate performance.

In one aspect of the present invention, the object is achieved by a method of operating a modulated continuous-wave radar system, comprising at least the following steps:

modulate a plurality of continuous radar waves at a modulation frequency for providing a plurality of n modulated continuous radar waves that represent mutually orthogonal codes, transmit the plurality of n modulated continuous radar waves towards a scene with a potential object to be detected, wherein the transmitted modulated continuous radar waves of the plurality of modulated continuous radar waves are consecutively transmitted with a constant time lag given by one nth of a period of the modulation frequency, receive a plurality of radar waves that have been transmitted by the radar system and have been reflected by an object, generate a plurality of received radar signals from the received plurality of radar waves, digitally convert the generated plurality of received radar signals with a sampling rate that is equal to the modulation frequency, decode individual range information for each received radar signal from the generated plurality of received radar signals, and determine a range between the radar system and the object on the basis of the decoded individual range information.

The phrase "modulation frequency", as used in this application, shall in particular be understood as the inverse of a duration that is required for modulating the plurality of continuous radar waves for mutual orthogonality. The term "mutually orthogonal codes", as used in this application, shall in particular be understood to enable mutual zero cross-talk disturbance among the plurality of received radar waves at the receiving side. The phrase "consecutively transmitted with a constant time lag", as used in this application, shall in particular be understood such that onsets of two modulated continuous radar waves of the plurality of n modulated continuous radar waves that are consecutive in a temporal sense are separated in time by the constant time lag. This means that the plurality of n modulated continuous radar waves can be simultaneously transmitted for the most time of their duration.

It is noted that the modulated continuous radar waves of the plurality of modulated continuous radar waves that have been consecutively transmitted with a constant time lag and have been reflected by an object, are consecutively received with the same constant time lag.

Advantageously, it has been found that a higher range resolution can be achieved despite the use of conventional electronic circuitry having relatively low sampling rate by taking the effort of consecutively transmitting a plurality of modulated continuous radar waves representing orthogonal codes that are separated by a constant time lag and by combining the multiple range information. In a suitable embodiment, the effort of decoding the individual range information for each received radar signal can be kept at a tolerable level, as it may scale with the number n of transmitted, modulated continuous radar waves.

For further illustration, this concept is demonstrated in an example with a plurality of three modulated continuous radar waves representing mutually orthogonal codes (FIG. 1). The modulated continuous radar waves of the plurality of three modulated continuous radar waves are consecutively transmitted with a constant time lag which is given by one third of the period of a modulation frequency. The modulated continuous radar waves are supposed to have been reflected by an object at a distance from the radar system. For decoding, it is known in the art to assign range-Doppler information to a plurality of Doppler bins and a plurality of range gates (detection matrix). In FIG. 1, the decoded individual range information is represented by range gates. Each range gate is defined by a time-slot, which in turn represents a specific range interval. The duration $t_s$ of each of the range gates is given by the inverse of a sampling rate of an employed analog-to-digital converter, which equals the modulation frequency. By that, the resolution in range is limited to $c \cdot t_s/2$ (c denoting the speed of light).

Except for the constant time lag, the individual range information in the range gates is identical for all three modulated continuous radar waves. Three assumed "real" ranges $R_1$, $R_2$, $R_3$ are indicated in FIG. 1.

For range $R_1$, a peak in the range information would be indicated at range gate #3 of the first received radar signal, at range gate #2 of the second received radar signal and at range gate #2 of the third received radar signal; i.e. one peak at range gate #3 and two peaks at range gate #2. From these results it can be determined that the "real" range is indicated by a peak in range gate #6 of a plurality of range gates that is generated by combining the bounds of the range gates of all three received radar signals.

For range $R_2$, a peak in the range information would be indicated at range gate #2 of the first received radar signal, at range gate #2 of the second received radar signal and at range gate #1 of the third received radar signal; i.e. one peak at range gate #1 and two peaks at range gate #2. From these results it can be determined that the "real" range is indicated by a peak in range gate #4 of the combined range gates.

For range $R_3$, a peak in the range information would be indicated at range gate #4 of the first received radar signal, at range gate #4 of the second received radar signal and at range gate #4 of the third received radar signal; i.e. three peaks at range gate #4. From these results it can be determined that the "real" range is indicated by a peak in range gate #11 of the combined range gates.

As presented, the range resolution can be improved with employed analog-to-digital converters of conventional sampling rate performance by a factor of n.

It is noted that the proposed method is beneficially applicable to frequency-modulated continuous wave (FMCW) radar sensor systems and phase-modulated continuous wave (PMCW) radar sensor systems.

The orthogonality can be implemented in frequency-modulated continuous wave (FMCW) radars via a modulation of ramp length, bandwidth, time-shifts or any other method that appears suitable to those skilled in the art. In phase-modulated continuous wave (PMCW) radars, the coding can be adapted via bi-phased or multi-phased phase-modulation sequences, wherein members of the sequences are given by complex roots of unity, for example an Almost Perfect Auto-Correlation Sequence (APAS), a Maximum Length-Sequence (m-sequence) or any other sequence that appears suitable to those skilled in the art.

For FMCW radar systems, the modulation frequency can be given by the double of an expected maximum beat frequency. For PMCW radar systems, a period of the modulation frequency can be given by a duration of the sequence of numerical symbols that was applied for modulation. In this case, the modulation frequency will also be referred to as "modulation code frequency".

In preferred embodiments of the method, the step of transmitting a plurality of n modulated continuous radar waves that represent mutually orthogonal codes comprises consecutively transmitting modulated continuous radar waves of the plurality of modulated continuous radar waves with time lags having an absolute deviation of both onset and duration of less than 20% of one nth of a period of the modulation frequency.

From the example shown in FIG. 2 it becomes obvious to those skilled in the art that the combined range gates will become blurred if the absolute deviation of the onsets and/or durations of the time lags becomes too large. On the other hand, too harsh requirements regarding the absolute deviation of the time lags result in an unacceptably high hardware effort. The proposed absolute maximum deviation is a trade-off between an achievable increase in range resolution and hardware effort.

Preferably, the step of transmitting a plurality of n modulated continuous radar waves that represent mutually orthogonal codes comprises transmitting a plurality between and including two and fifty modulated continuous radar waves. Again, the proposed range for a number of modulated continuous radar waves balances a desirable improvement in range resolution and the hardware effort required for keeping the absolute deviation of the time lags sufficiently low.

In preferred embodiments, the modulated continuous-wave radar system is designed as a phase-modulated continuous-wave (PMCW) radar system, and the step of transmitting a plurality of n modulated continuous radar waves that represent mutually orthogonal codes comprises transmitting a plurality of n modulated continuous radar waves having an outer coding based on a sequence of numerical symbols, which can alleviate the effort for providing the plurality of n modulated continuous radar waves representing mutually orthogonal codes.

In other preferred embodiments, the modulated continuous-wave radar system is designed as a frequency-modulated continuous-wave (FMCW) radar system, and the step of transmitting a plurality of n modulated continuous radar waves that represent mutually orthogonal codes comprises transmitting a plurality of n modulated continuous radar waves that are orthogonally coded by at least one out of modulation of ramp length, bandwidth or time-shifts.

In this way, the well-known advantages of phase-modulated continuous wave (PMCW) radar systems or frequency-modulated continuous wave (FMCW) radar systems can readily be utilized in combination with the inventive method disclosed herein, depending on a considered application of the continuous-wave radar system.

In preferred embodiments of the method, the step of decoding includes downmixing or dechirping the received plurality of radar waves and carrying out either a fast Fourier transform (FFT) or a correlation analysis at the downmixed or dechirped radar waves of the plurality of radar waves. This step of decoding can be beneficially applied in particular for automotive radar systems designed as an FMCW radar system (in this case: FFT) or for automotive radar systems designed as a PMCW radar system (in this case: correlation analysis). Downmixing or Dechirping techniques are well-known in the art and therefore need not be discussed in more detail herein.

In another aspect of the invention, an automotive continuous-wave radar system is provided. The automotive continuous-wave radar system comprises a radar wave generator that is configured to provide continuous radar waves, a modulation unit that is configured to modulate the provided continuous radar waves at a modulation frequency for providing a plurality of n modulated continuous radar waves that are mutually orthogonal, a radar wave transmitting unit that is configured to transmit the plurality of n modulated orthogonal continuous radar waves towards a scene with potential objects to be detected, wherein the transmitted modulated orthogonal continuous radar waves of the plurality of modulated continuous radar waves are consecutively transmitted with a constant time lag given by one nth of a period of the modulation frequency, a radar wave receiving unit that is configured to receive a plurality of radar waves that have been transmitted by the radar wave transmitting unit and have been reflected by an object, radar electronic circuitry that is configured to generate a plurality of received radar signals from the received plurality of radar waves, and to digitally convert the generated plurality of received radar signals with a sampling rate that is equal to the modulation frequency, a decoding unit that is configured to decode individual range information for each received radar signal from the generated plurality of received radar signals, and an evaluation and control unit that is configured for controlling at least one other unit of the radar system and for reading out the decoded individual range information of each received radar signal of the generated plurality of received radar signals, and is further configured for determining a range between the radar system and the object on the basis of the decoded individual range information.

The term "automotive", as used in this application, shall particularly be understood as being suitable for use in passenger cars, trucks and buses. The phrase "being configured to", as used in this application, shall in particular be understood as being specifically programmed, laid out, furnished or arranged.

The benefits described in context with the proposed method of operating a modulated continuous-wave radar system apply to the modulated continuous-wave radar system to the full extent.

Preferably, the modulation unit comprises modulation means to provide the plurality of n modulated continuous radar waves that are mutually orthogonal, wherein the modulation means are either configured for operating the continuous-wave radar system as a phase-modulated continuous-wave radar system or as a frequency-modulated continuous-wave radar system.

The assets and drawbacks of FMCW and PMCW radar systems are, for instance, discussed in Levanon, N., and Getz, B.: "*Comparison between linear FM and phase-coded CW radars*", IEE Proceedings-Radar, Sonar and Navigation 141.4 (1994), 230-240. This article shall hereby be incorporated by reference in its entirety with effect for those jurisdictions permitting incorporation by reference.

Preferably, the evaluation and control unit comprises a processor unit and a digital data memory unit to which the processor unit has data access. In this way, the decoded individual range information of each received radar signal can be read out, and the range between the radar system and the object can be determined on the basis of the decoded individual range information within the automotive continuous wave radar system to ensure a fast and undisturbed signal processing and evaluation.

In yet another aspect of the invention, a software module for controlling automatic execution of steps of an embodiment of the method disclosed herein is provided.

The method steps to be conducted are converted into a program code of the software module, wherein the program code is implementable in a digital memory unit of the automotive continuous wave radar system and is executable by a processor unit of the automotive continuous wave radar system. The digital memory unit can be implemented as a computer-readable medium on which is stored the program code of the software module. Preferably, the digital memory unit and/or processor unit may be a digital memory unit and/or a processor unit of the evaluation and control unit of the automotive continuous wave radar system. The processor unit may, alternatively or supplementary, be another processor unit that is especially assigned to execute at least some of the method steps.

The software module can enable a robust and reliable execution of the method and can allow for a fast modification of method steps.

These and other aspects of the invention will be apparent from and elucidated with reference to the embodiments described hereinafter.

It shall be pointed out that the features and measures detailed individually in the preceding description can be combined with one another in any technically meaningful manner and show further embodiments of the invention. The description characterizes and specifies one or more embodiments of the invention in particular in connection with the figures.

BRIEF DESCRIPTION OF THE DRAWINGS

Further details and advantages of the present invention will be apparent from the following detailed description of not limiting embodiments with reference to the attached drawing, wherein.

DETAILED DESCRIPTION

Figure 2:
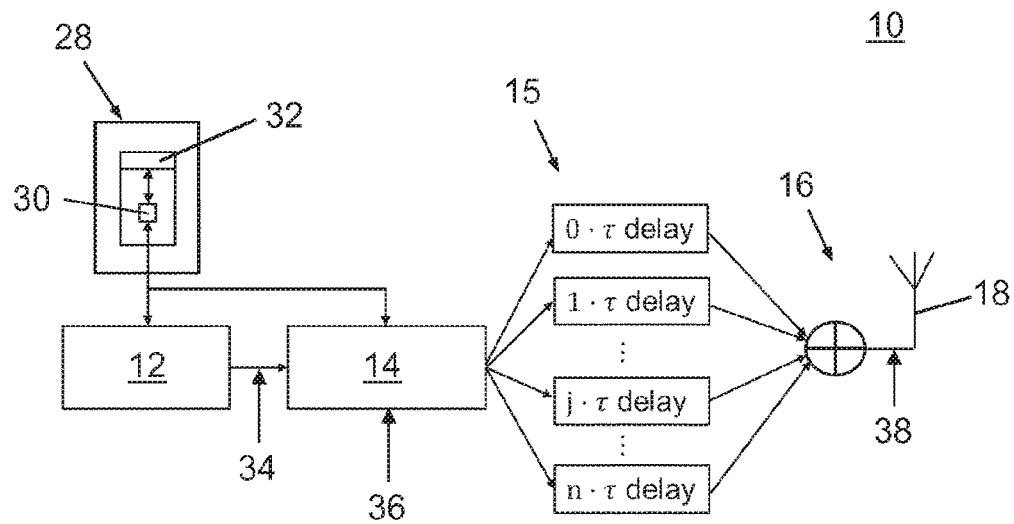
FIG. 2 is a functional scheme of a transmitting side of an automotive continuous-wave radar system designed as a phase-modulated continuous-wave radar system.
Figure 3:
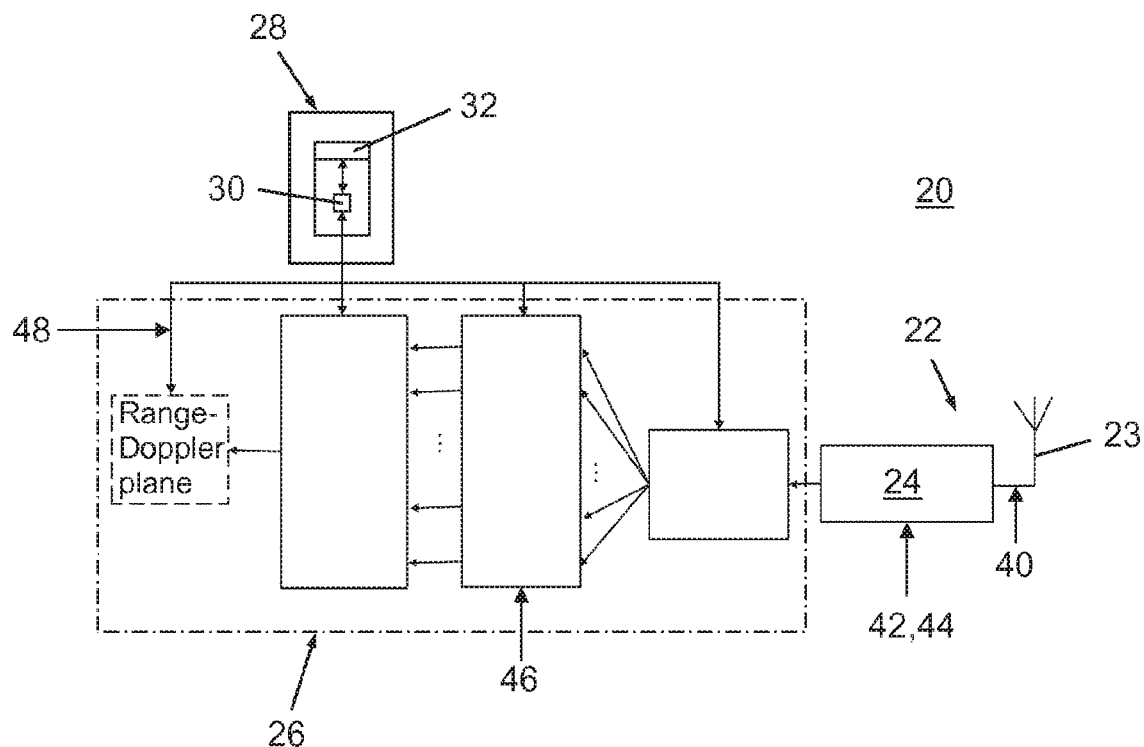
FIG. 3 is a functional scheme of a receiving side of the automotive continuous-wave radar system pursuant to FIG. 2.
Figure 5:
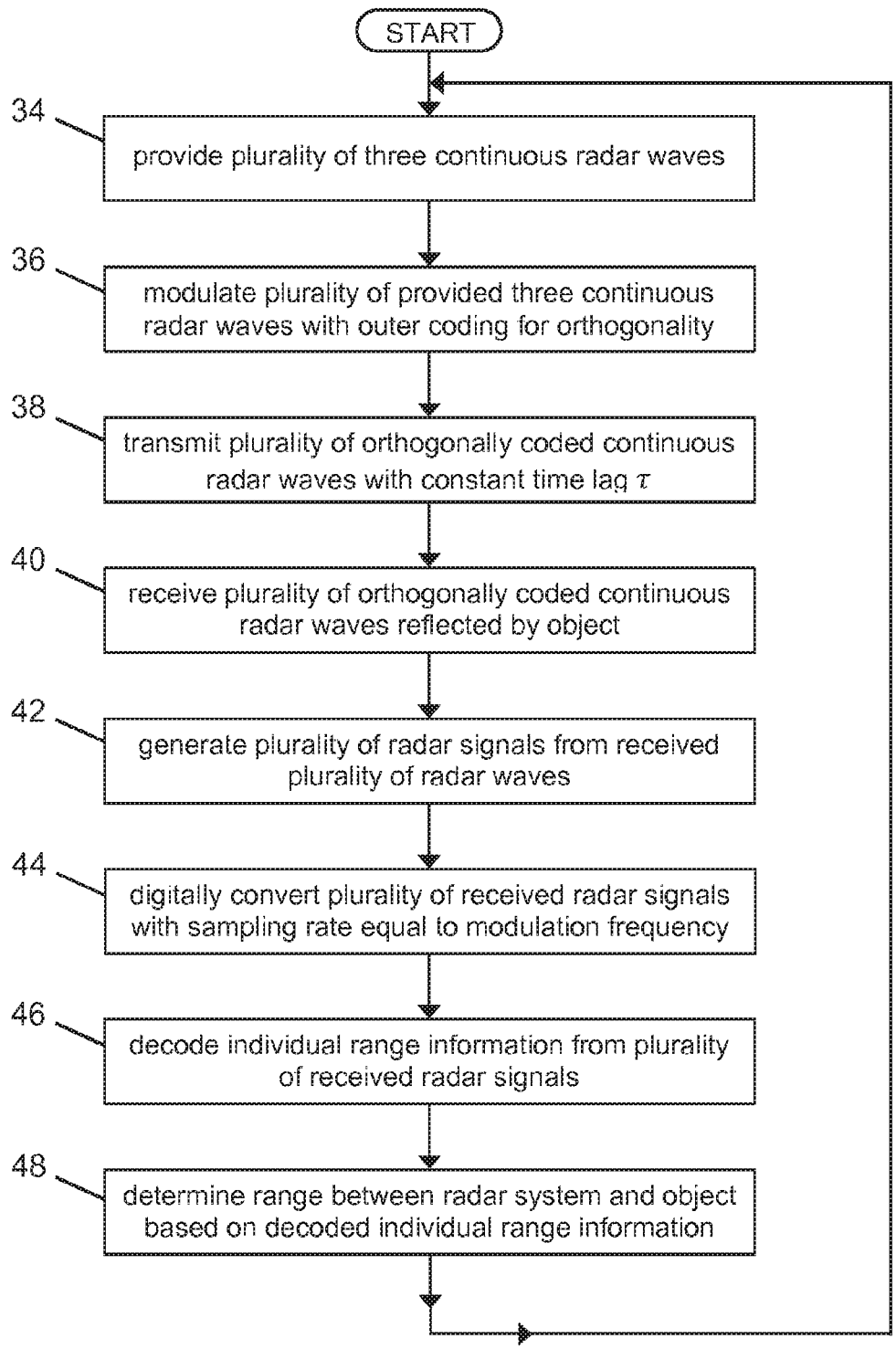
FIG. 5 is a flowchart of a possible embodiment of a method in accordance with the invention of operating the modulated continuous-wave radar system pursuant to FIGS. 2 and 3.

In the following, a possible embodiment of a method in accordance with the invention of operating a modulated continuous-wave radar system, comprising a transmitting side 10, a receiving side 20 and an evaluation and control unit 28. The modulated continuous-wave radar system is described with reference to FIGS. 2 and 3, showing functional schemes of the transmitting side 10 and the receiving side 12, respectively. The method in accordance with an embodiment of the invention is described with reference to a flowchart shown in FIG. 5.

In this specific embodiment, the modulated continuous-wave radar system is designed as a phase-modulated continuous-wave (PMCW) radar system for automotive applications, more specifically for a vehicle parking assistant system. The PMCW radar system is configured to operate at a radar carrier frequency of about 77 GHz.

In an alternative embodiment, the modulated continuous-wave radar system may as well be designed as a frequency-modulated continuous-wave radar system, with suitably adapted method steps, as will be readily acknowledged by those skilled in the art.

The steps of the method are automatically and repetitively, preferably periodically, carried out. Commencing execution of the steps may be initiated by a control unit of the vehicle parking assistant system.

In a first step 34 of the method, a plurality of continuous radar waves is provided by a radar wave generator 12 of the transmitting side 10. The radar wave generator 12 comprises a local oscillator and an electronic mixer (not illustrated), as is well-known in the art. In this specific embodiment, the number n of continuous radar waves is ten. In other embodiments, the number of continuous radar waves may lie in a range between two and fifty.

By a modulation unit 14 of the transmitting side 10, the plurality of continuous radar waves is modulated in another step 36 to represent mutually orthogonal codes, so that the continuous radar waves of the plurality of three continuous radar waves are mutually orthogonal.

Figure 4:
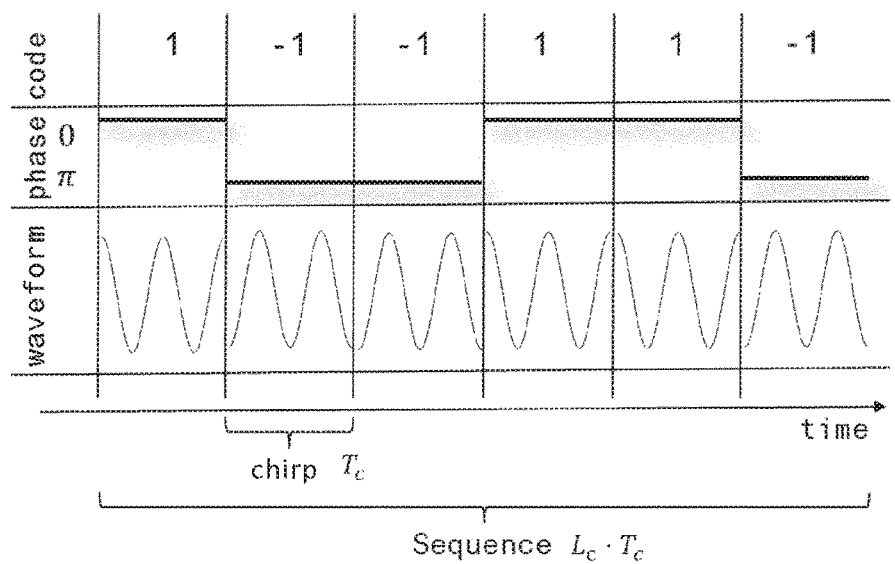
FIG. 4 shows a phase-modulated continuous wave for operating the automotive continuous-wave radar system pursuant to FIG. 2.

In this specific embodiment of a PMCW radar system, the phase modulation is based on bi-phase modulation, which means a phasing of φ(t)=0° or φ(t)=180° for the continuous radar wave. A phase code $c=(c_k)\in\{-1,1\}^{L_c}$, which is meant to be transmitted could be properly chosen, for example as an Almost Perfect Auto-Correlation Sequence (APAS) or a Maximum Length-Sequence (m-sequence), depending on the requirements. The phase can then be modelled via $$\varphi_c(t) := \begin{cases} 0° & \text{if } C_{\lfloor \frac{t}{T_c} \rfloor \bmod L_c} = 1 \\ 180° & \text{if } C_{\lfloor \frac{t}{T_c} \rfloor \bmod L_c} = -1 \end{cases}$$

with chirp duration $T_c$ and code length $L_c$. One potential phase-modulated radar waveform is illustrated in FIG. 4.

Each continuous radar waves of the plurality of three continuous radar waves is modulated with a different phase code for providing mutual orthogonality by outer coding. A modulation code frequency is given by the inverse of the product of chirp duration $T_c$ and code length $L_c$. In this specific example, the modulation code frequency is selected from a range between 500 MHz and 2 GHz.

A radar wave transmitting unit 16 of the transmitting side 10 comprises a radar transmitting antenna 18 and is configured to transmit the plurality of three modulated orthogonal continuous radar waves 15 towards a scene with potential objects to be detected. The transmitted modulated orthogonal continuous radar waves of the plurality of modulated continuous radar waves are consecutively transmitted in a next step 38 of the method with a constant time lag τ (FIGS. 1 and 2) given by one 3rd of a period of the modulation code frequency. In this specific embodiment, the time lags τ show an absolute deviation of less than 10% of one 3rd of a period of the modulation code frequency.

If a potential object occurs in a field of view of the PMCW radar system, the transmitted modulated orthogonal continuous radar waves of the plurality of modulated continuous radar waves will be reflected by the object and received by a radar receiving antenna 23 of a radar receiving unit 22 (FIG. 3) of the receiving side 20 of the PMCW radar system in another step 40.

A radar electronic circuitry 24 of the receiving side 20 contains at least an electronic mixer and a low-pass filter (not illustrated) and is configured to generate a plurality of received radar signals from the received plurality of radar waves in a next step 42 of the method. In another step 44, an analog-to-digital converter (not illustrated) of the radar electronic circuitry, with a sampling rate $1/t_S$ that is equal to the modulation code frequency ($t_S$: sampling period, FIG. 1), digitally converts the generated plurality of received radar signals.

In a next step 46 of the method, a decoding unit 26 of the receiving side 20 comprising a correlation bank (not illustrated) decodes individual range information for each received radar signal from the generated plurality of three received radar signals. A number of parallel correlators of the correlation bank is equal to sequence length $L_c$ to provide the range processing in a single step. The various Doppler shifts present in the radar-illuminated scene superimpose in the range gates and Doppler bins. Coherent accumulators will increase the signal-to-noise ratio (SNR) by carrying out a predetermined number of accumulations, and at least a Fast Fourier Transform (FFT) of predetermined length N to extract the Doppler information will be performed. By that, the spatial information can be divided in individual range gates.

The evaluation and control unit 28 of the PMCW radar system is configured for controlling the radar wave generator 12, the modulation unit 14, and the decoding unit 26. The evaluation and control unit 28 is equipped with a processor unit 30 and a digital data memory unit 32 to which the processor unit 30 has data access, and is further equipped with a software module. Method steps to be conducted are converted into a program code of the software module. The program code is implemented in the digital data memory unit 32 of the evaluation and control unit 28 and is executable by the processor unit 30 of the evaluation and control unit 28.

The evaluation and control unit 28 receives the decoded individual range information of each received radar signal of the generated plurality of three received radar signals from the decoding unit 26. On the basis of the decoded individual range information, and with the a priori knowledge about the continuous radar waves of the plurality of three orthogonally coded continuous radar waves having been consecutively transmitted with delays of (j−1)τ, the evaluation and control unit 28 determines, in another step 48, a range between the modulated continuous-wave radar system and the object.

Figure 1:
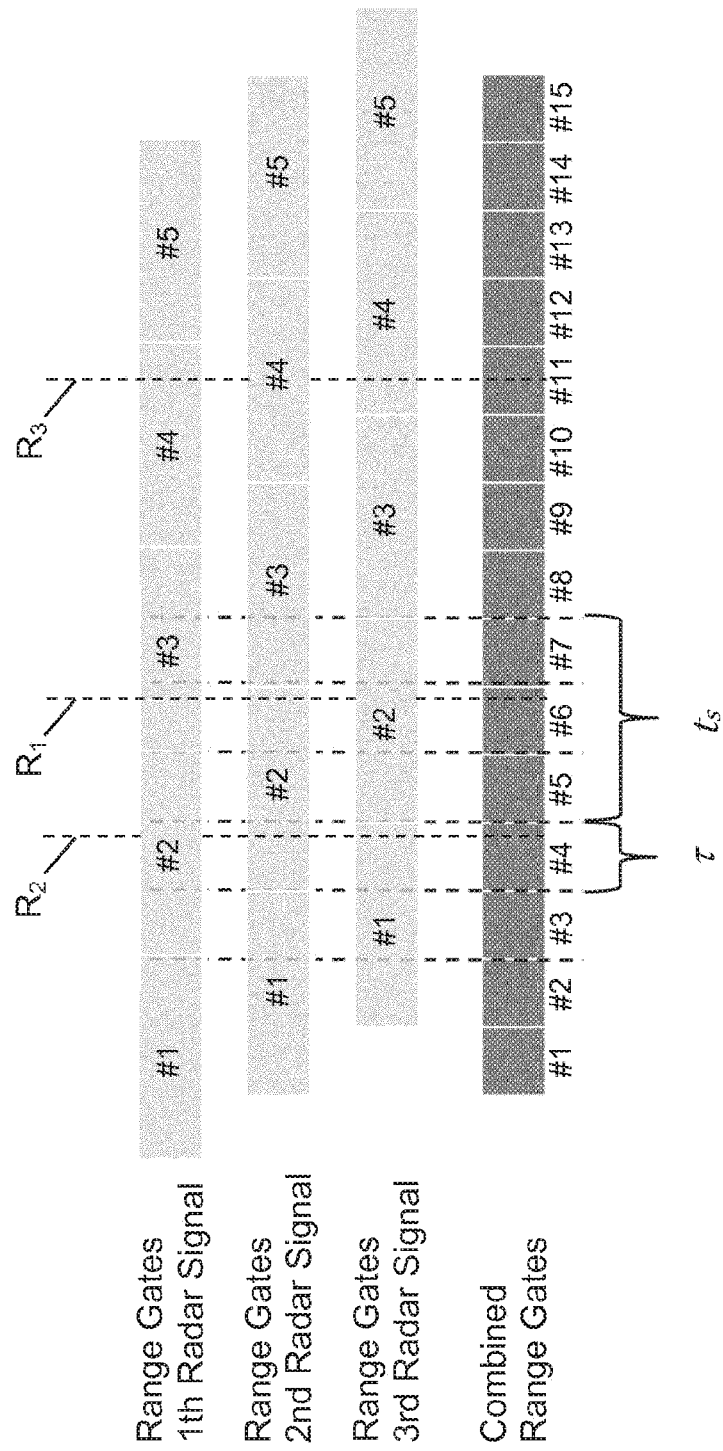
FIG. 1 schematically shows individual range gate information for a plurality of three radar signals received after reflection of a plurality of three modulated continuous radar waves representing mutually orthogonal codes, consecutively transmitted with a constant time lag, at an object.

FIG. 1 schematically shows the individual range gate information for the three radar signals of the plurality of three radar signals consecutively transmitted with a constant time lag τ and received with constant time lags after reflection by the object.

More formally in a mathematical sense, the methodology for using and processing the radar signals can be formulated as follows:

Let $x_1, \ldots, x_n$ be orthogonal codes and $X_1, \ldots, X_n$ be corresponding continuous radar waves after being transmitted with the modulation frequency of $1/t_s$. Assuming that the radar wave transmitting unit 16 simultaneously and continuously transmits the waveforms with time lag τ

$$X_j(t-(j-1)\tau),$$
$$\tau = \frac{t_s}{n}, j = 1, \ldots, n,$$

the following signal is received from a given fixed target at distance R:

$$XR_j(t-(j-1)\tau-T), j=1, \ldots, n$$

with $$T = \frac{2R}{c} \text{ (neglecting amplitude)}.$$

The digitization with sampling period $t_s$ yields the codes $$r(j, T) := circShift\left(x_j, \left\lfloor \frac{(j-1)\tau - T}{t_s} \right\rfloor\right),$$

wherein circShift denotes the circular shift by the second argument, and the lower bracket denotes rounding towards the next lower integer. In order to decode the range information, these signals have to be processed by performing the multiplication with the according matrix A (correlation bank for PMCW radar systems, FFT for FMCW radar systems):

$$dec_{r(j,T)} = A \cdot r(j,T)$$

The mutual orthogonality of the radar signals enables the separate processing of the codes r(j,T).

The result is n times the range information, each of which corresponds to a range grid $$RG_j, j=1, \ldots, n$$

with a resolution according to the modulation frequency $1/t_s$. With the a priori knowledge that the continuous radar waves of the plurality of orthogonally coded continuous radar waves have been consecutively transmitted with delays of $(j-1)\tau$, one can conclude that the $RG_j$ actually represent mutually shifted range grids. Hence, taking the combination of the information in the range grids $RG_j$ (peaks), the range resolution is increased by a factor of n.

Thus, the proposed method can enable a high range resolution with a comparably low sampling rate of the analog-to-digital converter of $1/t_s$.

While the invention has been illustrated and described in detail in the drawings and foregoing description, such illustration and description are to be considered illustrative or exemplary and not restrictive; the invention is not limited to the disclosed embodiments.

Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality, which is meant to express a quantity of at least two. The mere fact that certain measures are recited in mutually different dependent claims does not indicate that a combination of these measures cannot be used to advantage. Any reference signs in the claims should not be construed as limiting scope.

The invention claimed is:

1. A method of operating a modulated continuous-wave radar system, comprising at least the following steps:
   modulate a plurality of continuous radar waves at a modulation frequency for providing a plurality of n modulated continuous radar waves that represent mutually orthogonal codes,
   transmit said plurality of n modulated continuous radar waves towards a scene with a potential object to be detected, wherein the transmitted modulated continuous radar waves of the plurality of modulated continuous radar waves are consecutively transmitted with a constant time lag given by one nth of a period of the modulation frequency,
   receive a plurality of radar waves that have been transmitted by the radar system and have been reflected by an object,
   generate a plurality of received radar signals from the received plurality of radar waves,
   digitally convert the generated plurality of received radar signals with a sampling rate that is equal to the modulation frequency,
   decode individual range information for each received radar signal from the generated plurality of received radar signals, and
   determine a range between the radar system and the object on the basis of the decoded individual range information.

2. The method as claimed in claim 1, wherein the step of transmitting a plurality of n modulated continuous radar waves that represent mutually orthogonal codes comprises consecutively transmitting modulated continuous radar waves of the plurality of modulated continuous radar waves with time lags having an absolute deviation of both onset and duration of less than 20% of one nth of a period of the modulation frequency.

3. The method as claimed in claim 1, wherein the step of transmitting a plurality of n modulated continuous radar waves that represent mutually orthogonal codes comprises transmitting a plurality between and including two and fifty modulated continuous radar waves.

4. The method as claimed in claim 1, wherein the modulated continuous-wave radar system is designed as a phase-modulated continuous-wave radar system, and wherein the step of transmitting a plurality of n modulated continuous radar waves that represent mutually orthogonal codes comprises transmitting a plurality of n modulated continuous radar waves having an outer coding based on a sequence of numerical symbols.

5. The method as claimed in claim 1, wherein the modulated continuous-wave radar system is designed as a frequency-modulated continuous-wave radar system, and wherein the step of transmitting a plurality of n modulated continuous radar waves that represent mutually orthogonal codes comprises transmitting a plurality of n modulated continuous radar waves that are orthogonally coded by at least one out of modulation of ramp length, bandwidth or time-shifts.

6. The method as claimed in claim 1, wherein the step of decoding includes downmixing or dechirping the received radar waveforms and carrying out either a fast Fourier transform or a correlation analysis at the downmixed or dechirped radar waveforms.

7. A non-transitory computer-readable medium for controlling automatic execution of steps of the method as claimed in claim 1, wherein the method steps to be conducted are converted into stored on the computer-readable medium as a program code, wherein the computer-readable medium comprises a part of the automotive continuous wave radar system or a separate control unit and is executable by a processor unit of the automotive continuous wave radar system or a separate control unit.

8. An automotive continuous-wave radar system, comprising:
   a radar wave generator that is configured to provide continuous radar waves,
   a modulation unit that is configured to modulate the provided continuous radar waves at a modulation frequency for providing a plurality of n modulated continuous radar waves that are mutually orthogonal,
   a radar wave transmitting unit that is configured to transmit the plurality of n modulated orthogonal continuous radar waves towards a scene with potential objects to be detected, wherein the transmitted modulated orthogonal continuous radar waves of the plurality of modulated continuous radar waves are consecutively transmitted with a constant time lag given by one nth of a period of the modulation frequency,
   a radar wave receiving unit that is configured to receive a plurality of radar waves that have been transmitted by the radar wave transmitting unit and have been reflected by an object,
   radar electronic circuitry that is configured to generate a plurality of received radar signals from the received plurality of radar waves, and to digitally convert the generated plurality of received radar signals with a sampling rate that is equal to the modulation frequency,
   a decoding unit that is configured to decode individual range information for each received radar signal from the generated plurality of received radar signals, and an evaluation and control unit that is configured for controlling at least one other unit of the radar system, for reading out the decoded individual range information of each received radar signal of the generated plurality of received radar signals, and for determining a range between the radar system and the object on the basis of the decoded individual range information.

9. The automotive continuous wave radar system as claimed in claim 8, wherein the modulation unit comprises modulation means to provide the plurality of n modulated continuous radar waves that are mutually orthogonal, wherein the modulation means are either configured for operating the continuous-wave radar system as a phase-modulated continuous-wave radar system or as a frequency-modulated continuous-wave radar system.

10. The automotive continuous wave radar system as claimed in claim 8, wherein the evaluation and control unit comprises a processor unit and a digital data memory unit to which the processor unit has data access.

\* \* \* \* \*